(12) United States Patent
De Sousa et al.

(10) Patent No.: US 11,053,890 B2
(45) Date of Patent: Jul. 6, 2021

(54) ASSEMBLY COMPRISING AN EXHAUST CASE AND A DOWNSTREAM ROTATIONALLY SYMMETRICAL PART

(71) Applicant: Safran Aircraft Engines, Paris (FR)

(72) Inventors: Mario Cesar De Sousa, Moissy-Cramayel (FR); Benoit Argemiro Matthieu Debray, Moissy-Cramayel (FR); Dominique Michel Fouquet, Moissy-Cramayel (FR); Gregory Ghosarossian-Prillieux, Moissy-Cramayel (FR); Frederic Noel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 134 days.

(21) Appl. No.: 15/580,496

(22) PCT Filed: Jun. 10, 2016

(86) PCT No.: PCT/FR2016/051415
§ 371 (c)(1),
(2) Date: Dec. 7, 2017

(87) PCT Pub. No.: WO2016/198806
PCT Pub. Date: Dec. 15, 2016

(65) Prior Publication Data
US 2018/0171932 A1    Jun. 21, 2018

(30) Foreign Application Priority Data

Jun. 11, 2015    (FR) ........................................ 1555331

(51) Int. Cl.
*F02K 1/80*    (2006.01)
*F02K 1/04*    (2006.01)
(Continued)

(52) U.S. Cl.
CPC .............. *F02K 1/80* (2013.01); *F01D 25/162* (2013.01); *F01D 25/243* (2013.01); *F02K 1/04* (2013.01);
(Continued)

(58) Field of Classification Search
CPC ... F01D 9/02; F01D 9/04; F01D 9/047; F01D 25/162; F01D 25/24; F01D 25/243;
(Continued)

(56) References Cited

U.S. PATENT DOCUMENTS 3,014,741 A * 12/1961 McDowall ............ F01D 25/243
138/160
5,480,196 A * 1/1996 Adams, Jr. ............ F16L 21/022
285/347

(Continued)

FOREIGN PATENT DOCUMENTS

FR    2978989 A1     2/2013
FR    3053430 A1 *   1/2018 ............. F01D 5/066
WO   2013/163510 A1 10/2013

OTHER PUBLICATIONS

Preliminary Research Report received for French Application No. 1555331, dated Mar. 30, 2016, 3 pages (1 page of French Translation Cover Sheet and 2 pages of original document).
(Continued)

*Primary Examiner* — Michael Lebentritt
*Assistant Examiner* — Jason G Davis
(74) *Attorney, Agent, or Firm* — Womble Bond Dickinson (US) LLP

(57) ABSTRACT

The invention relates to an assembly comprising: a turbomachine exhaust case (110) that includes an external sleeve and an internal sleeve inside the former, both sleeves extending concentrically about a turbomachine axis, and also includes a plurality of arms extending radially between the
(Continued)

sleeves; and an annular part (130) that is centered about the axis, is mounted on one sleeve of the exhaust case, and is located downstream of the exhaust case in the direction in which the air flows inside the turbomachine; the assembly is characterized in that the annular part and the sleeve of the exhaust case on which the annular part is mounted each have a circumferential thread (131, 115), said threads cooperating with each other in order to allow the annular part to be screwed onto the sleeve of the exhaust case.

13 Claims, 5 Drawing Sheets

(51) Int. Cl.
  *F02K 1/48* (2006.01)
  *F01D 25/16* (2006.01)
  *F01D 25/24* (2006.01)
  *F02K 1/38* (2006.01)

(52) U.S. Cl.
  CPC ............... *F02K 1/386* (2013.01); *F02K 1/48* (2013.01); *F05D 2220/32* (2013.01); *F05D 2260/30* (2013.01); *F05D 2260/31* (2013.01)

(58) Field of Classification Search
  CPC .......... F01D 25/246; F02K 1/04; F02K 1/386; F02K 1/48; F02K 1/52; F02K 1/80; F05D 2220/32; F05D 2230/60; F05D 2240/128; F05D 2240/14; F05D 2250/311; F05D 2260/30; F05D 2260/31
  See application file for complete search history.

(56) References Cited

U.S. PATENT DOCUMENTS

| | | | | |
|---|---|---|---|---|
| 6,336,790 | B1* | 1/2002 | Jacobsson | F01D 9/04 415/189 |
| 6,908,121 | B2* | 6/2005 | Hirth | F16L 15/08 285/318 |
| 7,384,075 | B2* | 6/2008 | Ress, Jr. | F01D 11/00 285/333 |
| 2004/0135370 | A1* | 7/2004 | Evans | E21B 43/108 285/333 |
| 2013/0115051 | A1* | 5/2013 | Bouchard | F02K 1/827 415/119 |
| 2014/0053563 | A1 | 2/2014 | De et al. | |
| 2014/0209292 | A1* | 7/2014 | Watson | F04D 29/086 166/105 |
| 2016/0298492 | A1* | 10/2016 | Smith | F01D 25/243 |
| 2016/0369655 | A1* | 12/2016 | Scott | F01D 25/243 |
| 2018/0202359 | A1* | 7/2018 | Bifulco | F02C 7/04 |

OTHER PUBLICATIONS

International Search Report and Written Opinion received for PCT Patent Application No. PCT/FR2016/051415, dated Sep. 13, 2016, 12 pages (6 pages of English Translation and 8 pages of Original Document).

International Preliminary Report on Patentability issued for PCT Application No. PCT/FR2016/051415, dated Dec. 21, 2017, 12 pages (6 pages of English Translation and 6 pages of original document).

* cited by examiner

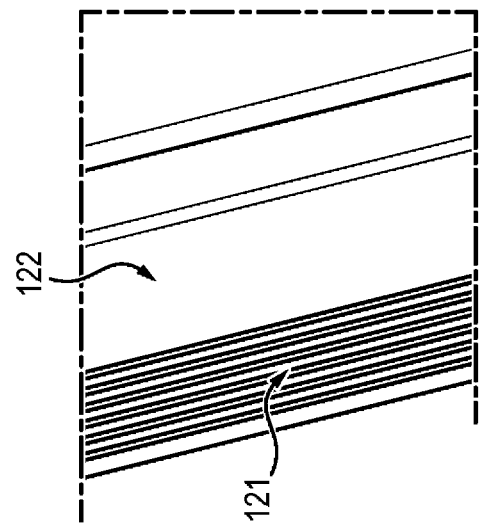
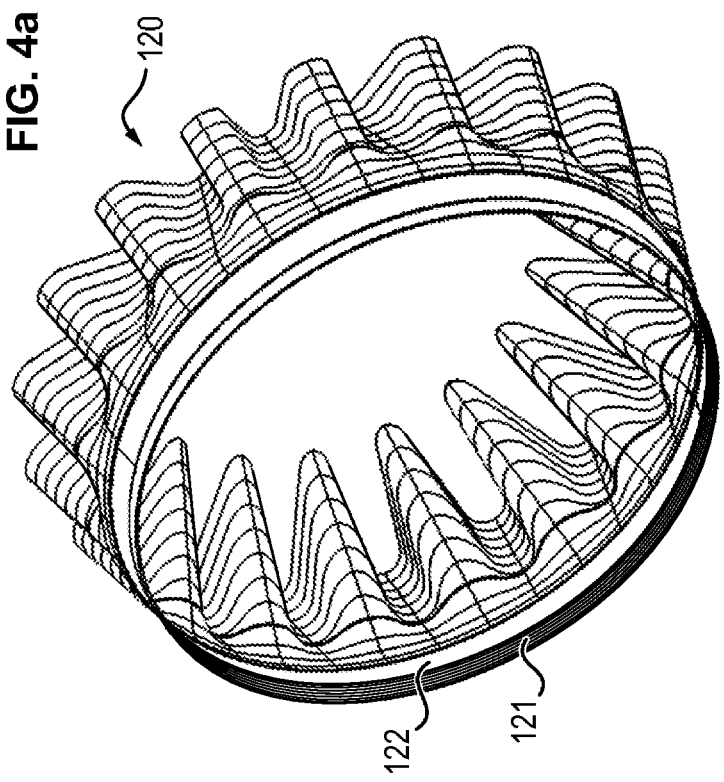

ASSEMBLY COMPRISING AN EXHAUST CASE AND A DOWNSTREAM ROTATIONALLY SYMMETRICAL PART

FIELD OF THE INVENTION

The invention relates to a turbomachine assembly comprising an exhaust case and a downstream annular part which may be a mixer or an exhaust nozzle or an exhaust cone.

PRIOR ART

An example of a known turbomachine assembly comprising an exhaust case 10, a mixer 20, and an exhaust cone 30 is shown in FIG. 1.

The exhaust case is a rotationally part around an axis (not shown) of the turbomachine located immediately downstream of a low-pressure turbine TuBP of the turbomachine, with respect to the flow direction of air in the turbomachine.

The exhaust case 10 comprises an inner shroud 11 and an outer shroud 12, these two shrouds being rotationally cylindrical parts extending one inside the other concentrically around the axis of the turbomachine.

The exhaust case further comprises a plurality of radial arms 13 extending between the inner shroud 11 and the outer shroud 12.

The mixer 20 is a part composed of a circular attachment flange to which is welded a sheet metal part with a lobed annular shape. The mixer 20 is an annular part centered on the axis of the turbomachine, mounted on the outer shroud of the case, downstream of the latter. In a bypass type turbomachine, the mixer 20 is the part at which the primary flow and the secondary flow are mixed. It has, for optimizing this mixing, a section in a plane orthogonal to the axis of revolution having a generally circular shape and forming undulations.

As a variant, the mixer may be replaced by an exhaust nozzle without lobes.

The exhaust cone 30 is also an annular part centered on the turbomachine axis, having the shape of a cone of which the open end is mounted on the inner shroud of the exhaust case, downstream of the latter.

The air flow leaving the exhaust case 10 therefore circulates between the exhaust cone 30 and the nozzle or the mixer 20.

As may be seen in FIG. 1, the mixer and the exhaust cone are attached to the respective shrouds of the exhaust case by bolting.

In this regard, each shroud comprises a scalloped flange dedicated solely to this assembly.

FIG. 2a shows a view of the assembly of the mixer 20 on the exhaust case. The outer shroud of the case comprises a scalloped flange 15 oriented substantially axially with respect to the axis of the turbomachine, the orientation of a flange being defined by the orientation of the bolts allowing its assembly. Each scallop comprises a through opening allowing the bolting of the mixer. Likewise, the mixer 20 comprises a scalloped flange 21 corresponding to the flange 15 of the exhaust case.

FIG. 2b shows a view of the assembly of the exhaust cone 30 on the exhaust case 10. The inner shroud of the case also comprises a substantially radial scalloped flange 16. Each scallop also comprises a through opening for bolting the exhaust cone.

Likewise, a circumferential section 31 of the exhaust cone comprises opening allowing its bolting to the exhaust case. Moreover, this section comprises an additional thickness including the radial scallops so as to embed the heads of the screws and to guarantee the mechanical strength of the connection.

The assembly of the bolts and the additions of materials (scallops, additional thickness) induces a mass for the assembly of the parts which may be substantially optimized.

DESCRIPTION OF THE INVENTION

One of the aims of the invention is to propose an alternative to a bolted connection of an exhaust case to an exhaust cone, a mixer or an exhaust nozzle allowing a mass saving in these parts.

In this regard, the invention relates to an assembly comprising:

a turbomachine exhaust case, comprising two shrouds, respectively inner and outer, extending one inside the other concentrically around a turbomachine axis, and a plurality of arms extending radially between the shrouds, and an annular part centered on the axis, mounted on a shroud of the exhaust case, downstream of said case with respect to an air flow in the turbomachine, the assembly being characterized in that the annular part and the shroud of the case on which it is mounted each include a circumferential thread, said threads cooperating to allow mounting by screwing of the annular part on the shroud of the case.

Advantageously, but optionally, the assembly according to the invention may further comprise at least one of the following features:

The thread of the shroud of the case may be made on a radially outer surface of the shroud.

The assembly may further comprise a stopping system in axial translation of the annular part on the shroud of the case.

The stopping system in axial translation comprises at least one groove arranged in the shroud of the exhaust case while being adjacent to the thread.

The groove may be circumferential.

The stopping system in axial translation comprises a plurality of threaded through openings arranged on the annular part and suitable for being located facing the groove when the part is screwed on the exhaust case, and a plurality of screws suitable for being screwed into the openings.

The annular part may be a mixer or an exhaust nozzle mounted on the outer shroud of the exhaust case.

The annular part may be an exhaust cone mounted on the inner shroud of the exhaust case.

Each screw may further be formed to be able to be integrally contained in a volume consisting of an opening of the exhaust cone and the groove of the exhaust case.

The invention also relates to a turbomachine, comprising an assembly according to the preceding description.

The invention may also relate to an exhaust case, a mixer, an exhaust nozzle or an exhaust cone that is a part of the assembly described previously.

The proposed assembly allows a reduction of mass of about 500 g with respect to the prior art. In fact, the scallops and bolts are eliminated and replaced by a thread. In the case where the part is an exhaust cone, the necessary additional thickness for bolting the exhaust cone is also eliminated.

Threading is a solution that is very suitable for this type of connection with regard to mechanical loads to which the connection is subjected, Threading further has the advantage of facilitating the manufacture and maintenance of the assembly, thus reducing its production and maintenance cost.

DESCRIPTION OF THE FIGURES

Others features, aims and advantages of the invention will be revealed by the description that follows, which is purely illustrative and not limiting, and which must be read with reference to the appended drawings in which:

FIGS. 4a and 4b illustrate a mixer of an assembly according to an embodiment of the invention.

DETAILED DESCRIPTION OF AT LEAST ONE EMBODIMENT OF THE INVENTION

Figure 1:
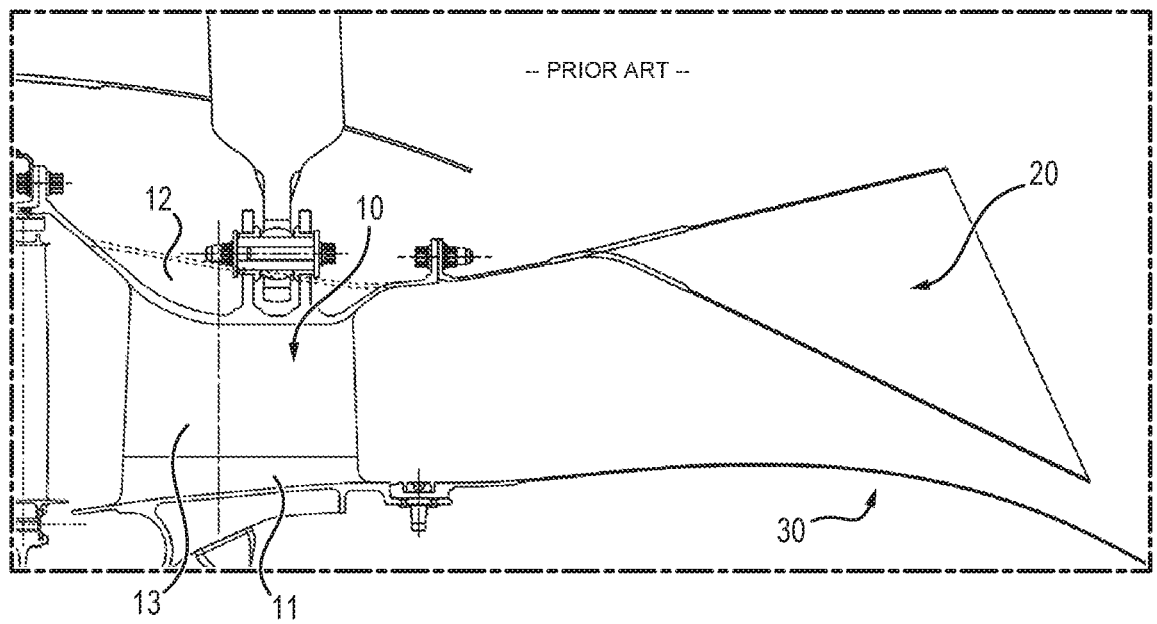
FIG. 1, already described, shows a turbomachine assembly comprising an exhaust case according to the prior art, FIGS. 2a and 2b, also already described, are detail views of the assembly of an exhaust case respectively to a mixer and to an exhaust cone according to the prior art.
Figure 2A:
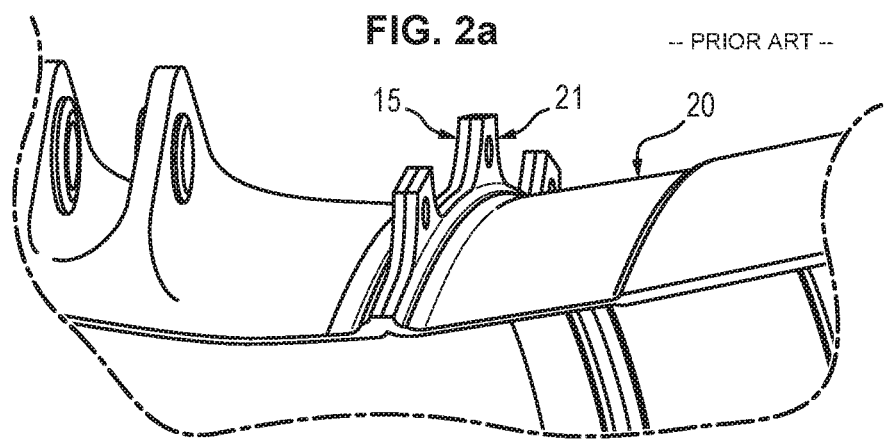
Figure 2B:
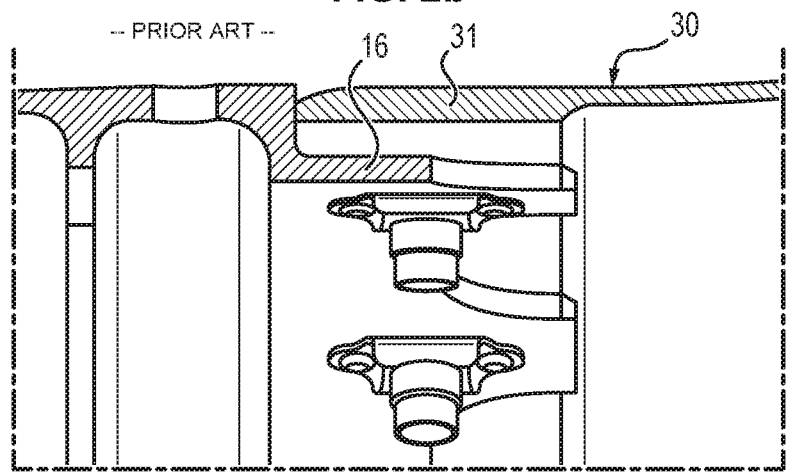

At least one turbomachine assembly 1 will now be described according to one embodiment of the invention.

The assembly 1 comprises an exhaust case 110, the exhaust case being a rotationally part around an axis X-X of the turbomachine. The assembly 1 further comprises at least one annular part screwed onto the exhaust case on a downstream side of the exhaust case with respect to an air flow in the turbomachine—the part having its axis on the axis X-X when it is mounted on the exhaust case.

The annular part may be either a nozzle or a mixer 120, in the case of a bypass type turbomachine, or an exhaust cone 130.

According to an advantageous variant, the assembly 1 comprises an exhaust case 110, an exhaust cone 130, as well as a nozzle or a mixer 120 screwed onto the case 110.

The different components of the assembly will be described in more detail.

Exhaust Case

The exhaust case 110 comprises an inner shroud 111 and an outer shroud 112, the two shrouds being rotationally cylindrical parts extending one inside the other concentrically around the axis X-X of the turbomachine.

The exhaust case further comprises a plurality of radial arms 113 with respect to the axis X-X of the turbomachine, extending between the inner shroud 111 and the outer shroud 112.

The exhaust case 110 further comprises at least one circumferential thread, 114, 115 arranged respectively in a surface of the inner shroud 111 and/or of the outer shroud 112.

Advantageously, the thread 114, 115 is made on a radially outer surface 111*, 112* of the corresponding shroud, in proximity to the downstream edge of said surface.

Each circumferential thread allows mounting by screwing of a respective annular part. The thread thus extends over a plurality of turns of each shroud, preferably between 2 and 10 turns, for example over 4, 5 or 6 turns.

Figure 3A:
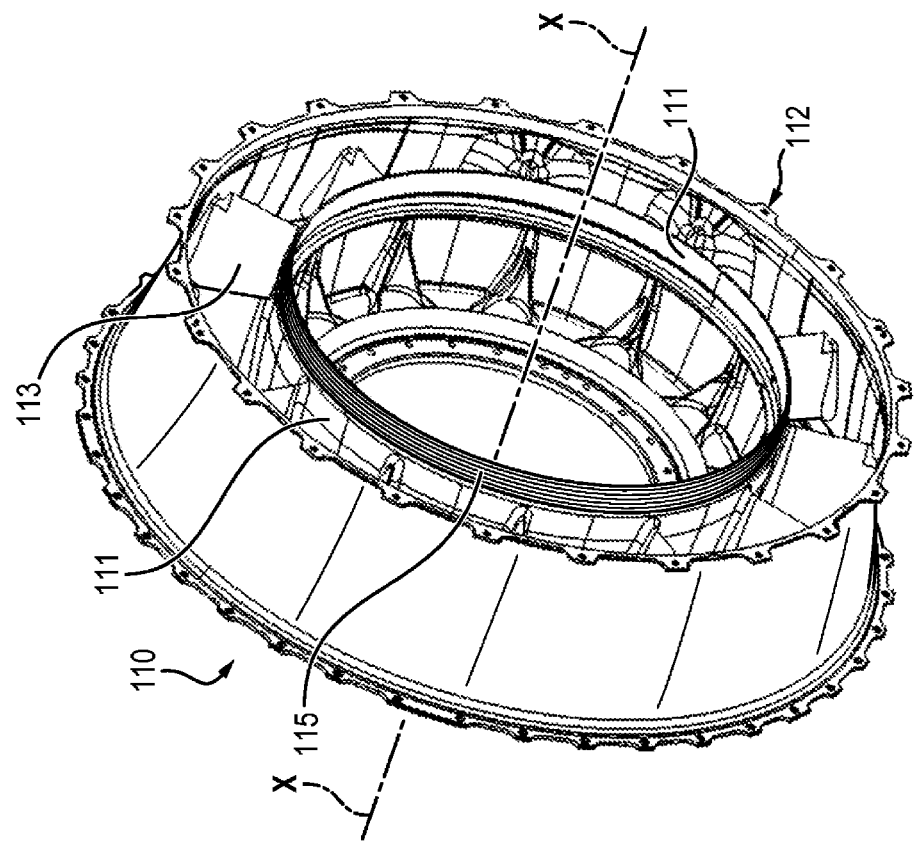
FIGS. 3a and 3b illustrate an exhaust case according to two variant embodiments of the invention.

Thus, with reference to FIG. 3a, the exhaust case 110 comprises, on an outer surface 112* of the outer shroud 112, a circumferential thread 114, this thread allowing mounting by screwing of an exhaust nozzle or of a mixer 120 on the outer shroud 112 of the exhaust case 110.

Figure 3B:
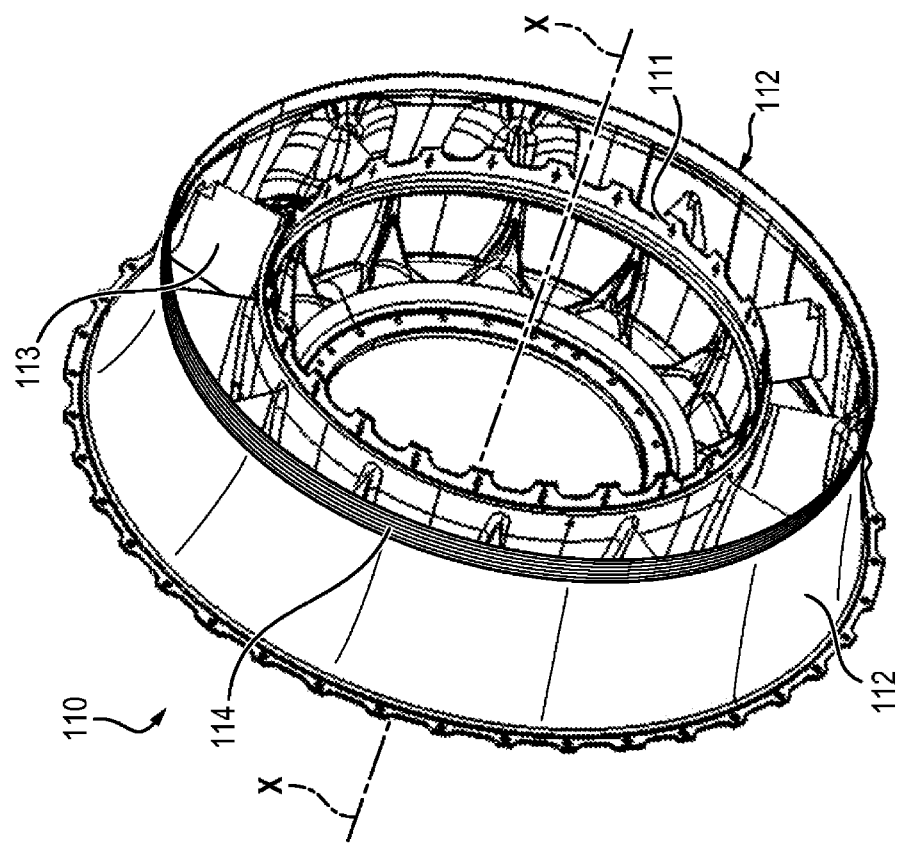

With reference to FIG. 3b, the exhaust case comprises, on the outer surface 111* of the inner shroud 111, a circumferential thread 115, this thread allowing mounting by screwing of an exhaust cone 130 on the inner shroud 111 of the exhaust case 110.

Advantageously, the exhaust case 110 comprises two threads 114, 115 made on the outer 112 and inner 111 shrouds, so as to be able to screw a mixer or an exhaust nozzle on the outer shroud and an exhaust cone on the inner shroud. In this case, the exhaust cone extends inside the exhaust nozzle or the mixer 120, coaxially.

If the exhaust case 110 includes a thread on an inner or outer shroud, the scalloped flange used before for the mounting of the corresponding downstream part by bolting is eliminated.

Exhaust Case or Mixer

With reference to FIGS. 4a and 4b, the annular part able to be screwed onto the exhaust case may be a mixer 120 or an exhaust nozzle.

To allow screwing of the nozzle onto the outer shroud 112 of the case, the latter also comprises a circumferential thread 121. The thread 121 is suitable for cooperating with the thread 114 of the outer shroud 112 of the exhaust case 110. In this regard, the circumferential thread of the mixer or of the nozzle 120 is preferably made on a radially inner surface 122 of it, to cooperate with a thread 114 arranged on a radially inner surface 112* of the shroud 112.

Exhaust Cone

Figure 5A:
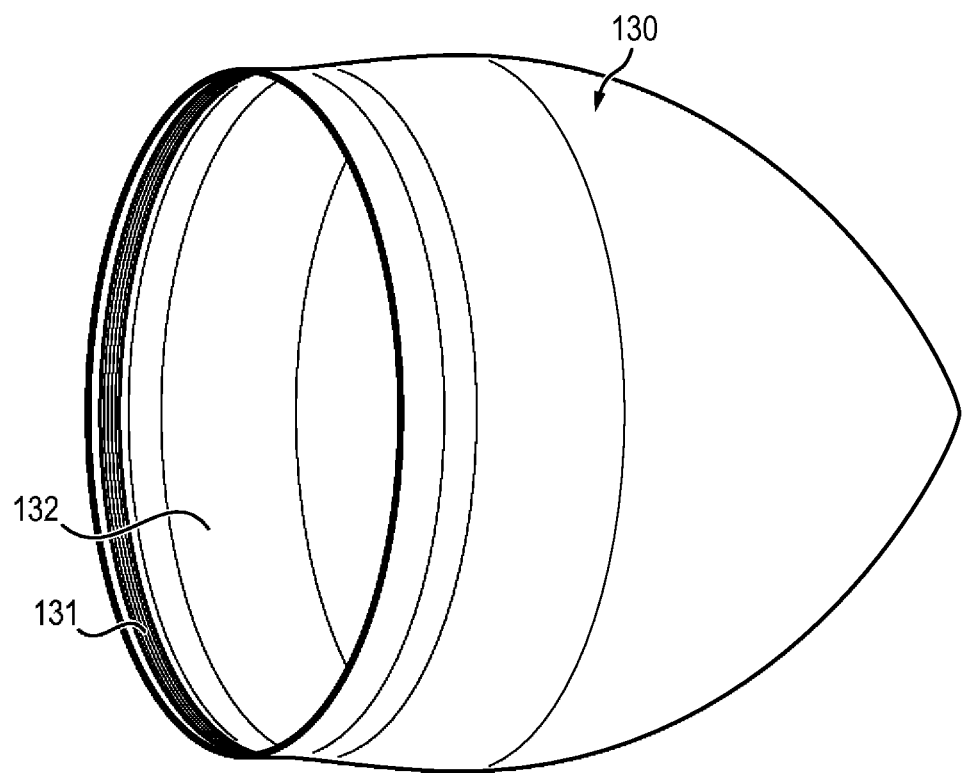
FIGS. 5a and 5b illustrate an exhaust cone of an assembly according to an embodiment of the invention.
Figure 5B:
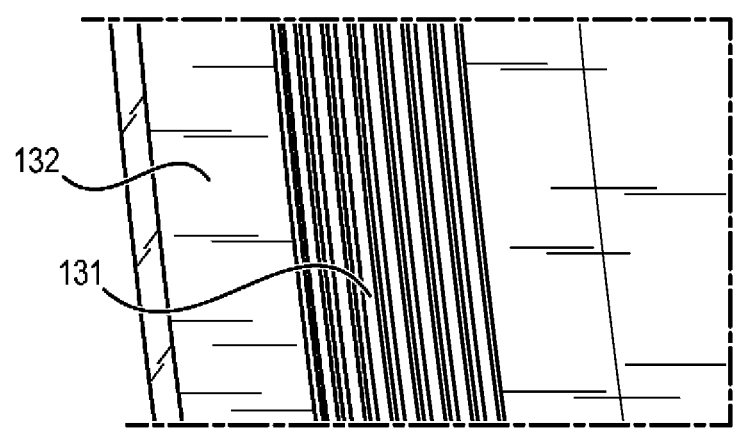

With reference to FIGS. 5a and 5b, the annular part able to be screwed onto the exhaust case may be an exhaust cone 130.

To allow the screwing of the exhaust cone 130 onto the inner shroud 111 of the exhaust case, the latter also includes a circumferential thread 131. The thread 131 is suitable for cooperating with the thread 115 of the inner shroud of the exhaust case 110. In this regard, if the thread 115 is made on an outer surface 111* of the shroud of the case, the thread 131 is made on a radially inner surface 132 of the exhaust cone 130.

Preferably, the threads 114, 115 of the exhaust case 110 as well as the thread(s) 121, 131 of the nozzle/of the mixer 120 and/or of the exhaust cone 130 are suitable for allowing good angular indexing of the downstream part 120, 130 with respect to the exhaust case 110.

For example, the nozzle, the mixer as well as the exhaust cone may have one or more drainage openings which must be situated in the low position when the part is mounted on the case, i.e. substantially vertically below the axis of the turbomachine ("at 6 o'clock").

The threads of the exhaust case 110 and of the downstream part to be angularly indexed must therefore be suitable for allowing this positioning, by selecting precisely the angular position of the start of each thread on each part. To accomplish this, each thread is preferably made by milling.

Translation Stopping

Advantageously, the assembly 1 further comprises a stopping system 140 in axial translation of the downstream part on the exhaust case. In the case where the assembly 1 comprises a mixer or an exhaust nozzle 120 and an exhaust cone 130 screwed onto the exhaust case, the stopping system 140 is applicable both to stopping translation of the exhaust cone 130 with respect to the case 110 and of the mixer or the nozzle 120 with respect to the case 110.

Figure 6A:
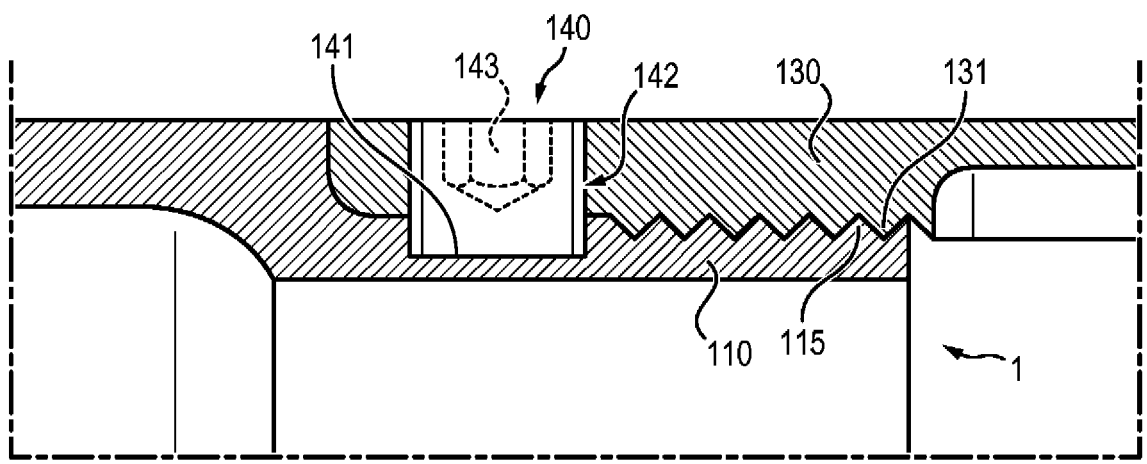
FIG. 6a is a section view of the assembly of an exhaust cone on an exhaust case.
Figure 6B:
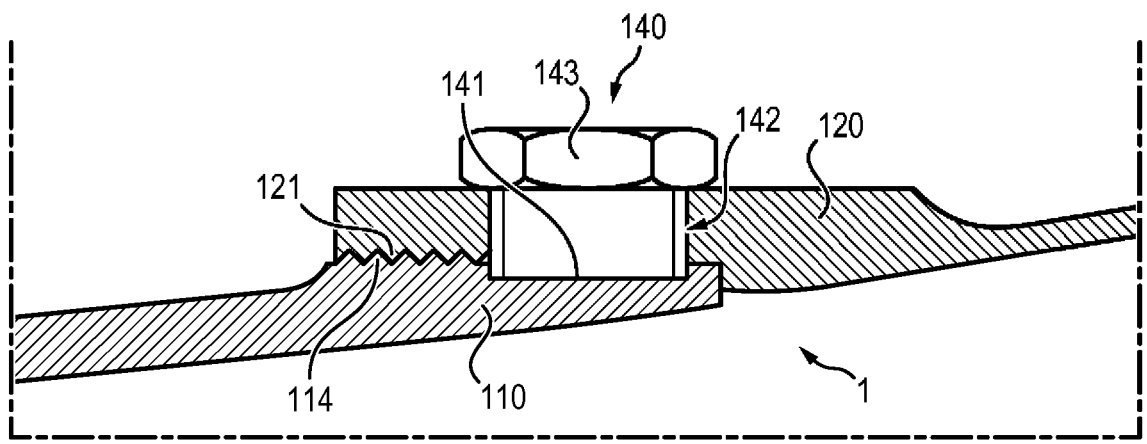
FIG. 6b is a section view of the assembly of a nozzle or a mixer on an exhaust case.

The stopping system in axial translation is shown in FIG. 6a, for the case where the downstream part is an exhaust cone 130, and in FIG. 6b, in the case where it is an exhaust nozzle or a mixer 120.

The translation stopping system 140 advantageously comprises a groove 141 made adjacently to the thread 114 or 115 of the exhaust case, i.e. on the outer surface respectively of the outer shroud 112 and/or the inner shroud 111 of the exhaust case.

The groove 141 is preferably circumferential. Alternatively, the groove 141 may comprise a plurality of circular sector sections. According to another alternative, less advantageous however for reasons of manufacturability, the groove 141 may be replaced by local machining, disposed at the exact locations of the screws.

In addition, the translation stopping system 140 comprises at least one through opening 142 made in the circumferential wall of the downstream part having the thread 131, 132. Each through opening 142 is threaded.

Preferably, each downstream part (mixer or nozzle 120 or exhaust cone 130) includes a plurality of through openings 142 disposed regularly on the circumference of the wall having the thread. For example, the downstream part may comprise three through openings 142 distributed at a constant angular interval of 120°.

The locations of the openings 142 are selected so that the openings are located facing the groove 141 of the exhaust case when the annular part is screwed onto the case 110.

Finally, the stopping system 140 in axial translation comprises a plurality of screws 143 suitable for being screwed into the openings 142. Each screw is thus received in an opening 142 until it emerges into the groove 141. The end of the screw housed in the groove comes into abutment against the edges of the groove and prevents axial translation of the downstream part with respect to the exhaust case.

Preferably, as may be seen in FIG. 6a, when the downstream part is an exhaust cone 130, each screw 143 is formed so as to be integrally contained in a volume consisting of an opening 142 of the exhaust cone and the groove 141 of the exhaust case, so as not to protrude with respect to the exhaust cone 130.

Indeed, when the screw is disposed in an opening, the head of the screw is at a radially outer surface of the exhaust cone. Yet, as the air flow in the turbomachine takes place between the exhaust nozzle/the mixer and the exhaust cone, the fact that the head of the screw protrudes with respect to the exhaust cone would have an unfavorable impact on the air flow between the exhaust cone and the mixer or the nozzle.

The screws used may be of the type with a head female imprint, called BTR, or with rounded heads.

The replacement of a bolted connection with a screwed connection allows a reduction in the mass of the assembly. Preferably, to reduce the mass more considerably, both the exhaust cone and the nozzle or the mixer are formed to allow them to be screwed onto the exhaust case.

The invention claimed is:

1. An assembly of a turbomachine comprising:
 an exhaust case comprising:
  an outer shroud;
  an inner shroud concentric with the outer shroud and extending inside the outer shroud, a first circumferential thread being formed in one of the inner shroud and the outer shroud; and
 a plurality of arms extending radially between the inner shroud and the outer shroud;
 an annular part, a second circumferential thread being formed in the annular part, the second circumferential thread cooperating with the first circumferential thread to allow mounting by screwing of the annular part on the one of the inner shroud and the outer shroud wherein the first circumferential thread is formed, downstream of the exhaust case with respect to an air flow in the turbomachine; and
 a stopping system comprising:
  a groove arranged adjacent to the first circumferential thread and having a bottom;
  a plurality of threaded openings extending through the annular part and suitable for being located facing the groove when the annular part is screwed on the exhaust case; and
  a plurality of screws, each screw of the plurality of screws having the end, the plurality of screws being suitable for being screwed into the plurality of threaded openings so that the end of each screw of the plurality of screws comes into abutment against the bottom of the groove in order for the annular part to be stopped in axial translation relative to the exhaust case.

2. The assembly of claim 1, wherein the first circumferential thread formed on a radially outer surface of the one of the inner shroud and the outer shroud.

3. The assembly of claim 1, wherein the groove is circumferential.

4. The assembly of claim 1, wherein the annular part is a mixer or an exhaust nozzle mounted on the outer shroud.

5. The assembly of claim 1, wherein the annular part is an exhaust cone mounted on the inner shroud.

6. The assembly of claim 1, wherein the annular part is an exhaust cone mounted on the inner shroud; wherein each screw of the plurality of screws is further formed to be able to be integrally contained in a volume consisting of an opening of the plurality of the threaded openings and the groove.

7. A turbomachine, comprising an assembly of claim 1.

8. The assembly of claim 1, wherein the first circumferential thread is formed on a radially outer surface of the one of the inner shroud and the outer shroud, in proximity to a downstream edge of the radially outer surface.

9. The assembly of claim 1, wherein the first circumferential thread extends over two to ten turns of the one of the inner shroud and the outer shroud.

10. The assembly of claim 1, wherein a third circumferential thread is formed in the other of the inner shroud and the outer shroud to screw a mixer or an exhaust nozzle on the outer shroud and an exhaust cone on the inner shroud.

11. The assembly of claim 1, wherein the second circumferential thread is formed on a radially inner surface of the annular part.

12. The assembly of claim 1, wherein the first circumferential thread and the second circumferential thread are made by milling.

13. The assembly of claim 1, wherein the groove comprises a plurality of circular sector sections.

* * * * *